United States Patent [19]
Hodgdon et al.

[11] Patent Number: 4,851,100
[45] Date of Patent: Jul. 25, 1989

[54] NOVEL BIPOLAR MEMBRANES AND PROCESS OF MANUFACTURE

[75] Inventors: Russell B. Hodgdon, Sudbury; Samuel S. Alexander, Concord, both of Mass.

[73] Assignee: Ionics, Incorporated, Watertown, Mass.

[21] Appl. No.: 189,263

[22] Filed: May 2, 1988

[51] Int. Cl.$^4$ .............................................. G25B 13/08
[52] U.S. Cl. ...................................... 204/296; 427/58; 427/245; 521/25; 521/27
[58] Field of Search .................. 427/58, 245; 204/296; 521/25, 27

[56] References Cited
U.S. PATENT DOCUMENTS
4,116,889  9/1978  Chlanda et al. .................... 521/27

Primary Examiner—John F. Niebling
Assistant Examiner—Kathryn Gorgos
Attorney, Agent, or Firm—Norman E. Saliba

[57] ABSTRACT

Improved bipolar membranes comprised of two laminates, one a long term base stable thermoset anion exchange membrane and the other a strongly solvent bonded (solvent cast) thermoplastic water insoluble cation exchange membrane. The membranes have a useful level of acid and base efficiencies at low water splitting voltages, along with high current densities.

18 Claims, 1 Drawing Sheet

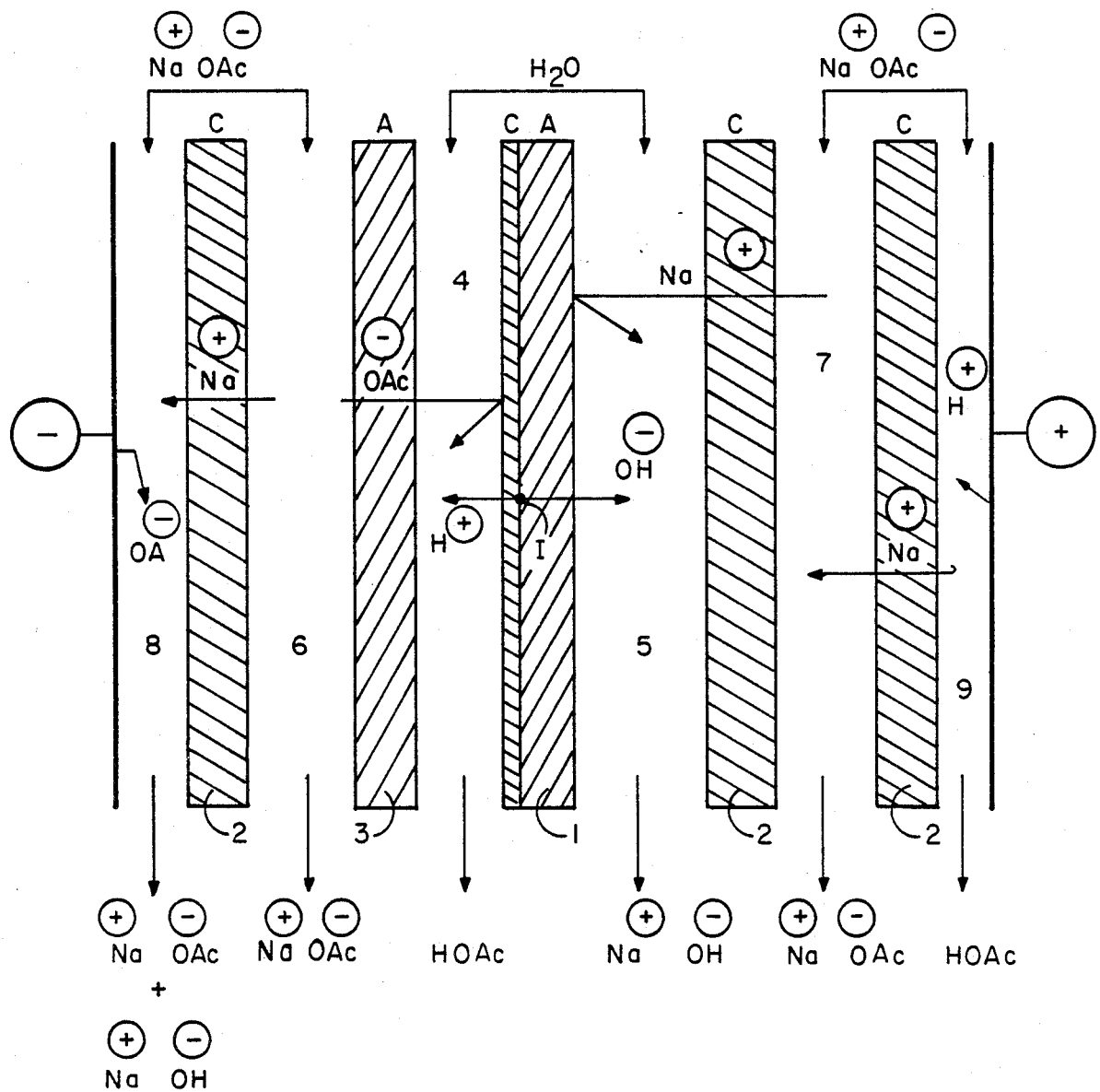

NOVEL BIPOLAR MEMBRANES AND PROCESS OF MANUFACTURE

BACKGROUND OF THE INVENTION

In 1956, a paper written by Vincent J. Frilette in the Journal of Physical Chemistry entitled "Preparation and Characterization of Bipolar Ion-Exchange Membranes", described a phenomenon known as "polarization", which occurred when a cation exchange membrane bonded intimately with an anion exchange membrane was placed in water or an aqueous electrolyte and a DC electrical field was applied with the cation exchange membrane surface facing the cathode $\ominus$ pole. Frilette showed that under a low voltage applied across the system, hydrogen ions migrated toward the cathode and hydroxide ions migrated toward the anode. The only plausible explanation for this was polarization, or water splitting at a lower energy than electrolysis (gas generation), at the interfacial plane of the anion and cation exchange membrane.

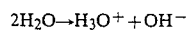

If the polarity was reversed, sodium and chloride ions would pass from a slightly saline solution and accumulate at the bipolar membrane interface. Since the discovery of the "bipolar" membrane effect by Frilette, numerous bipolar membrane structures have been synthesized and patented. All of these membranes, without exception, polarize in a DC electric field and all split water, giving off protons toward the cathode and hydroxide ions toward the anode.

Several patents have been issued during the past three decades since Frilette published his discovery of the bipolar membrane effect. These have covered the single film bipolar membrane, and the double film bipolar membrane. Each patent has made claims of superior durability, superior electrical conductance, and superior performance. None however addressed membrane caustic stability or a water supply to the bipolar membrane interface which are objects of the present invention.

In the case of the single bipolar membrane, F. B. Leitz in U.S. Pat. No. 3,562,139 describes the preparation of a bipolar membrane out of a single plastic film. The membrane was prepared by immersion of a 3 mil polyethylene (PE) film in a bath of styrene and divinyl benzene, polymerizing the same to give a polystyrene-polydivinyl benzene crosslinked polymer within the interstices of the PE film and then partially sulfonating one side of the aromatized film to form a cation exchange membrane followed by chloromethylation and amination of the opposite face of the film to form a single film bipolar membrane. This membrane split water in an electric field, but at a low current density of 9.3 milliamperes per centimeter square at a current efficiency of 58-66% (production of acid per theoretical Faraday of electricity).

Oda et al U.S. Pat. No. 2,829,095 disclosed a process for preparing acid and base solutions by use of a two sheet bipolar membrane employed in a cell along with a single polar cation and anion exchange membrane. These single membranes were prepared by separately mixing finely divided cation and anion exchange resins with polyvinyl chloride, with the bipolar membrane being put together by adhering each type of the above cation and anion exchange membranes with an epoxy resin comprising polyethylene imine with epichlorohydrin and hardening the adhesive layer. Indeed, using 0.5M NaCl, acid and base were generated at 20.8 ma/cm$^2$ with a voltage of 2.9 volts per cell group, with each cell group consisting of three membranes positioned between electrodes, i.e., a bipolar membrane (with the cation side facing the cathode), a single polar cation membrane and a single polar anion membrane respectively. This was indeed a patent demonstration of acid and base production from a sodium chloride feed using the bipolar membrane to split water into its acid and base components.

Dege and Liu, U.S. Pat. No. 4,024,043 describe another single film bipolar membrane claiming an ion selectivity above 80% in at least a 0.1 molar(M) solution of salt. The membrane synthesis is similar to that of Leitz, with claims made that membranes made had high performance data (for single film bipolar membranes) of 0.86 volts @ 109 ma/cm$^2$ up to 1.14 volts @ 91 ma/cm$^2$ between a 1N KOH and a 1N HCl solution. Current efficiencies were between 68 and 78% respectively.

Improvements in the preparation of single and double film bipolar membranes are further described by F. P. Chlanda, L. T. C. Lee, and K. J. Liu (U.S. Pat. Nos. 4,116,889 and 4,253,900) where double film bipolar membranes are prepared by fusing slurries of mixed fine cation and anion exchange resins in solvents between commercially available anion and cation exchange membranes. High acid and base current efficiencies were obtained using less than 10% solutions of HF and KOH at current densities of close to 100 ma/cm$^2$.

In 1987 Liu and Lee described in U.S. Pat. No. 4,673,454 a process for preparing an improved bipolar membrane, again of a double laminate, having high permselectivity and low potential drop. Using 1N Na$_2$SO$_4$ in the test cell, voltages of 1.2 volts to 2.0 volts at 100 amps/ft$^2$ were obtained across these double laminated membranes during the preparation of acid and base.

While the above listed patents describe ways and means of preparing single and double film bipolar membranes, along with voltage drops obtained at different current densities using different salts and solution concentrations; no mention has been made of water accessibility to the bipolar membrane interfaces or the expected life of the anion exchange portion in terms of caustic stability. The preparation of novel bipolar membranes having one thin component layer for facilitating a constant water supply to the bipolar interface and proven caustic stability of the anion exchange membrane portion will be the principal objects of this invention.

SUMMARY OF THE INVENTION

A review of both journal articles and patents concerned with the synthesis and testing of bipolar membranes indicates that nearly all bipolar membranes are comprised of a single structure anion exchange membrane; comprised principally of styrene-divinyl benzene copolymers, which have been functionalized by chloromethylation followed by amination with trimethyl amine. This functionalization yields the polymeric benzyl trimethyl ammonium chloride anion exchange group as follows:

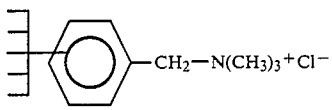

which will be converted to its hydroxide ion counterpart during water splitting associated with any operation of the bipolar membrane to convert salts to their respective acids and bases. The long term stability of the polymeric benzyl trimethyl ammonium hydroxide groups is not good at high pH values (i.e. In the pH range of 12 to 14), especially at temperatures between 35° C. and 50° C.

A commercially available anion exchange membrane of the above type (Ionics, Inc. AR103PZL-386) was tested for stability by determining the loss in ion exchange capacity (MEQ/DGR) at 25° C. and 45° C. over a period of 0 to 56 days at pH's of 13.0 and 12.0 with the following results:

TABLE 1

| pH | Temp. | 0 | 7 | 28 | 56 |
|---|---|---|---|---|---|
| 13.0 | 25° C. | 1.82* | 1.82 | 1.73 | 1.67 (8.2% Degraded) |
| 13.0 | 45° C. | 1.82 | 1.78 | 1.69 | 1.55 (14.8% Degraded) |
| 12.0 | 25° C. | 1.82 | 1.80 | 1.81 | 1.77 (2.7% Degraded) |
| 12.0 | 45° C. | 1.82 | 1.80 | 1.78 | 1.75 (3.8% Degraded) |

*Capacity in Milliequivalents per gram of dry resin(MEQ/DGR)

The above results show that long term operation of the above anion exchange membrane (as part of a bipolar membrane) in which the interstitial molality of $OH^-$ ion concentration would approach 2 m/l, would be limited. Thus at continuous operation at 2 m/l $OH^-$ counter-ion in a bipolar membrane where the anion exchange portion is of the polymeric benzyl trimethyl ammonium type, it can be predicted that membrane life, especially at operating temperatures above room temperature would not be expected to be for any extended period of time.

The present invention involves the synthetic preparation of a bipolar membrane wherein the anion exchange membrane component or cation exchange membrane component is not substantially degraded in high normality basic and acidic solutions.

A teaching of this invention, is the preparation of a quaternary ammonium anion exchange membrane for use in a bipolar membrane having a demonstrated base stable structure.

The stability of a bipolar membrane composed of an anion exchange membrane layer (of divinyl benzene copolymerized with dimethyl amino propyl methacrylamide and subsequently methylated to form a quaternary ammonium chloride) in concert with an acid stable cation exchange membrane layer would have long life during operation as a water splitting bipolar membrane. Thus the preparation of a base stable/acid stable bipolar membrane, embodying the quaternary ammonium anion exchange membrane described above is a primary object of this invention.

Another object of this invention is the solvent bonding of a thermoplastic cation exchange polyelectrolyte material onto the surface of an anion exchange membrane. Removal of the solvent will result in a bipolar membrane having a thin layer (not greater than 10 mil thick) of water insoluble cation exchange membrane permanently bonded to the surface of the anion exchange membrane.

The composite bipolar membrane of the present invention comprises for example a thick layer of 5–40 mils (preferably 12–20 mils) of a quaternized ammonium anion exchange base stable polymer and a solvent cast thin layer (preferably not thicker than 4 mils) of a cation exchange polymer of the following structure:

Formula 1

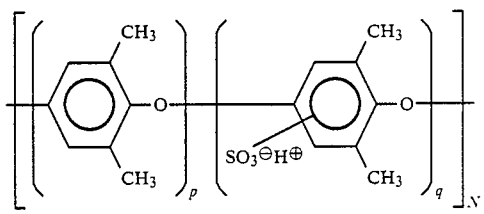

Formula 1 illustrates a partially sulfonated poly 2,6 dimethyl polyphenylene oxide where p=0.56 to 0.85 and q=0.44 to 0.15. The preferred ion-exchange capacities (IEC) are between about 1.14 to 2.83 millequivalents per dry gram of polymer (Meq/dgr).

In practice, as will be subsequently shown in the examples given hereafter, a methanol or chloroform-methanol solution of the partially sulfonated poly 2,6 dimethyl polyphenylene oxide is coated onto the surface of a nearly dry base stable anion exchange membrane and the solvent evaporated to yield a strongly bonded bipolar membrane. Subsequent immersion in water yields a bipolar membrane structure which resists peeling and delamination both in storage and cell usage.

Another object of this invention is to prepare a bipolar membrane having ample transmission of water to the cation exchange membrane-anion exchange membrane interface. This has been accomplished by affixing a thin solvent castable cation exchange membrane to the defined base stable anion exchange membrane. A variety of solvent castable thermoplastic cation exchange materials were prepared and each successfully bonded to the base stable anion exchange membrane as well as to other anion type exchange membranes by the technique described above and in examples which will follow hereafter. The following cation exchange materials were bonded, from solvent(s) onto anion exchange membranes to yield bipolar membranes.

(1) Partially sulfonated poly 2,6 dimethyl polyphenylene oxide (as described in formula 1). (U.S. Pat. No. 3,259,592)

(2) Partially sulfonated polyether sulfone (U.S. Pat. No. 3,709,841) as shown in the following structure:

Formula 2

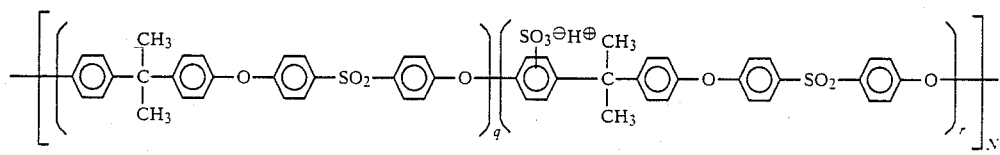

Where q=0.31 to 0.74, r=0.69 to 0.26 and where the IEC=0.58-1.43 Meq/dgm.

(3) Partially sulfonated high molecular weight polystyrene. R. B. Hodgdon, J. R. Boyack, J. Polymer Sci. (Part A)3 1463-72(1965)

Formula 3

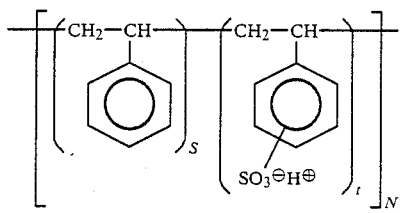

Where S=0.68 to 0.86, t=0.32 to 0.14 and I.E.C.=1.22-2.06 Meq/dgm.

The resulting laminated membranes when subsequently converted into an ionically conducting bipolar membrane by immersion in water, readily allows the transport of water from the surface of the thin cation exchange membrane layer to the interfacial plane of the bipolar membrane where water splitting occurs during application of a D.C. current.

In terms of stability in 4N sulfuric acid, tests on each of the above partially sulfonated polymeric materials at room temperature show substantially no loss in capacity. The results of these acid stability tests at various points from 0 to 84 days are listed in Table 2 below:

TABLE 2

| Polymer Formula | (I.E.C.) Ion Exchange Capacity* at Specific Time Periods | | | | |
|---|---|---|---|---|---|
| | 0 | 21 | 42 | 64 | 84 |
| (1) | 2.06* | 2.11 | 2.08 | 2.02 | 2.05 |
| (2) | 1.42 | 1.51 | 1.48 | 1.41 | 1.44 |
| (3) | 1.74 | 1.80 | 1.80 | 1.79 | 1.76 |

*I.E.C. is in units milliequivalents cation/dry gram resin.

Another object of this invention is to prepare uncrosslinked cation exchange membrane components which will, (by the nature of non-crosslinkage) have high water contents with retention of permselectivity. These cation exchange membrane components will permit sufficient hydraulic permeability to prevent the bipolar membrane interface from dehydrating during water splitting.

Another object of this invention is to prepare bipolar membranes having substantially no wet brittleness, and excellent durability and strength.

Another object of this invention is to prepare bipolar membranes exhibiting low electrical resistance across the membrane composite when used in an electrodialysis process for splitting salts of medium to high concentrations into their respective acids and bases. Low electrical resistance translates into low electrical potential drop. Since the product of the electrical potential times the applied current density in amperes per unit membrane area is the watts per unit area, the lower electrical resistance translates into energy efficiency.

The dual film bipolar membrane compositions of this invention are prepared by application of a solvated cation exchange material, a liquid cation exchange material, or a solvated polymer capable of being easily converted into a cation exchange membrane or film onto a preferably base stable or nearly base stable anion exchange membrane. It is essential that all of the above coatings adhere strongly to the surface of the anion exchange membrane and be inherently water insoluble. Such water insoluble (but organic solvent soluble) cation exchange materials are partially sulfonated aromatic polymers such as for example polystyrene, polyalkylstyrenes, 2,6 dialkyl polyphenylene oxides, 2,6 diaryl polyphenylene oxides, 2,6 aryl-alkyl polyphenylene oxides, polyether sulfones, substituted polyether sulfones, poly arylether sulfones, polyphenylene sulfides or any other substituted alk-aryl ether, thioether, sulfone, or a combination of same.

It is also a further object of this invention to prepare a bipolar membrane by direct application of a liquid ion exchange material onto the surface of a solid anion exchange membrane or cation exchange membrane. Examples of such liquid ion exchange materials are for example:

(1) Bis 2 Ethyl Hexyl Pyrophosphoric acid.

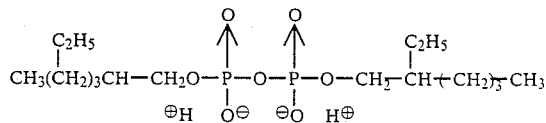

The above liquid cation exchange material, which is water insoluble, is painted onto the surface of a preferably base stable or nearly base stable anion exchange membrane to form, "in situ", a bipolar membrane. It may be applied as is or in a diluted solvent form.

(2) Tri Capryl Methyl Ammonium Chloride

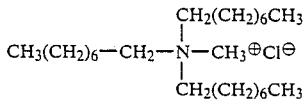

The above liquid anion exchange material which is water insoluble is painted onto the surface of a cation exchange membrane having good acid stability to form, "in situ", a bipolar membrane.

The bipolar membranes prepared by either of the above two combinations have value in that the oppositely charged materials bond well together to form stable structures. Further, the bipolar membranes may be regenerated by repainting with a fresh application of the charged liquid ion exchange material.

DETAILED DESCRIPTION OF THE INVENTION

In the drawing a typical arrangement utilizing any bipolar membrane prepared in accordance with the invention is illustrated. As shown, a bipolar (CA) membrane 1 is depicted schematically as a water-splitter in an electrodialysis cell. Acid ($H^+$) and base ($OH^-$) created at the interface I of the bipolar membrane migrate into compartments 4 and 5 positioned on opposite sides of the bipolar membrane 1, which compartments are also bounded by anion (A) permeable and cation (C) permeable ion exchange membranes 3 and 2 respectively. A salt solution of for example sodium acetate (NaOAc), is fed into the next adjacent compartments 6 and 7 which compartments are further separated from the electrode compartments 8 and 9; (also containing sodium acetate solution) by additional cation exchange membranes 2. Under the influence of a direct current (DC) of electricity, residual acetate anions ($OAc^-$) and cations ($Na^+$) within the bipolar membrane migrate out of the membrane toward the anode (+) and cathode (−) respectively, and in the vicinity of the interface I their concentrations rapidly decline to near zero. At this point, continued passage of the electric current can only occur (and must occur to keep electrical neutrality) by the splitting of water at the bipolar membrane interface I with the transfer of $OH^-$ and $H^+$ ions toward the anode (+) and the cathode (−) respectively.

During this process, at least one of the layers of the bipolar membranes must be sufficiently thin (preferably not greater than 4 mil thick) and water permeable so that water molecules will replace those split into ions at the bipolar membrane interface. If this does not happen, one or both layers of the bipolar membrane will dry out, resistivity will rise dramatically and the system will fail either by high resistivity or burn-out. Current efficiencies for the production of acid and base using bipolar membranes of this invention varied from 75% to 86% and 62% to 71% respectively at a current density of 60 $ma/cm^2$ and an electrolyte concentrations of 0.25N sodium acetate. When 0.025N sodium sulfate solution was converted in the electrodialysis cell, current efficiencies for the production of acid and base using membranes of this invention varied from 52% to 56% and 67% to 68%, respectively. Low electrical resistance translates into low electrical potential drop. Since the product of the electrical potential times the applied current density in amperes per unit membrane area is the watts per unit area, the lower electrical resistance translates into energy efficiency. When 0.025N sodium chloride solution was converted in the cell, current efficiencies for the production of acid and base using membranes of this invention varied from 51% to 54% and 65% to 73% respectively. All runs above were at 60 $ma/cm^2$. Voltage drops across the bipolar membranes used above for the conversion of sodium acetate, sodium sulfate, and sodium chloride at a 0.025N solutions were found to be 1.3 volts, 1.0 volts and 1.1 volts, respectively. It is recognized that the current efficiencies for acid and base generation are identical at the bipolar membrane. The differences reported are caused by loss of acid or base through the membranes adjacent to the bipolar membranes.

The bipolar membranes of the present invention are, for the most part, produced upon base stable quaternized ammonium anion exchange membranes onto which is coated (by brushing for example from solvents) an acid stable cation exchange membrane material.

The base stable membrane is prepared by polymerizing the monomer components on and about a fabric backing material to create an anion exchange membrane having the following typical properties:

Ion Exchange Capacity = 1.30 to 2.90 Meq. $OH^-$/g.dry resin

Resistivity (Area Basis) = 7.0 to 22.5 ohm-$cm^2$ in 0.01N NaCl @ 1000 Hertz

% Water Content (by Wgt.) = 30–54% (g.$H_2O$/g-$H_2O$ + Resin) × 100

Thickness = 0.048 to 0.064 cm (Wet)

It is also understood, that other anion exchange membranes capable of being prepared and converted into either a dry or nearly dry modification would serve as a support membrane so that a solution of cation exchange polyelectrolyte, either a liquid or solid cation exchange resin in a suitable solvent, could be coated onto same, and the composite, after drying, could be equilibrated in water to form a stable bipolar membrane.

Cation exchange materials, either of the solid or liquid type are preferentially dissolved in an appropriate solvent such as methyl alcohol, propanols, N-methyl pyrrolidone, dimethyl formamide, chloroform or methylene chloride or any mixture of the preceeding solvents and applied by brushing, flowing, rolling, spraying, or any other method of applying a thin solvent coat of either a dissolved solid or liquid cation exchange material onto one planar surface of the anion exchange membrane.

It is understood in this invention, that any coatable cation or anion exchange material whether "solid in solvent" or "liquid in solvent" may be coated onto any basic membrane film having an opposite fixed charge (+ or −) to the fixed charge of the moiety being applied. The joining of opposite fixed charged bodies with subsequent drying off of solvent would suggest that the firm adhesion of these membrane moieties to form a stable bipolar membrane in aqueous solution would be associated not only with resin penetration via the solvent of one component onto the other but by the electrostatic attraction of the aforementioned fixed opposite charges.

It is further understood that all bipolar membranes prepared by the present invention can function as excellent water splitters in an electrodialysis cell without blistering, delamination, or any other failure associated with intolerance to osmosis at membrane interfaces. These bipolar membranes possess the aforementioned stabilities even in the presence of 2N NaOH, 2N $H_2SO_4$, 2N NaCl, 2N sodium acetate, and 1N sodium citrate.

The following examples set forth certain preferred techniques for preparing bipolar membranes. However, it should be understood that these examples do not constitute limitations upon the scope of the invention which is defined solely by the claims appended hereto.

EXAMPLE #1

Preparation of a Base Stable Membrane

A total of sixteen anion membranes were prepared by first preparing a monomer mix containing divinyl benzene, dimethyl amino propyl methacrylamide (DMAPMA), and a suitable non-polymerizable solvent and a suitable catalyst, impregnating a modacrylic reinforcing fabric, with the monomer mix, and polymerizing overnight in an oven. The monomer proportions were formulated to prepare a polymer with a nominal crosslinking of 40%. Following polymerization, the polymer sheets were methylated with methyl chloride to quaternize the amine functional groups. The quaternized membranes were then washed and equilibrated with water. Typical properties of these membranes are:

Thickness (wet)=0.057 cm
(I.E.C.) Ion Exchange Capacity=2.70 Meq/Dry Gm. Resin
Wet Basis Water Content=44.3%
Areal Resistivity (ohm-cm$^2$; 1000 Hz) 0.01N NaCl=19.1 ohm-cm$^2$

EXAMPLE #2

The same procedure was followed as in Example #1, except that the proportion of the monomers was changed to increase the nominal crosslinking to 30%. The resulting membranes had the following properties:

Thickness=0.061 cm
I.E.C.=2.90 Meq/dgr
Water Content=48.9%
Areal Resistivity=21.4 ohm-cm$^2$

EXAMPLE #3

The same procedure was followed as in Example #1 except that the proportion of the monomers was changed to increase the nominal crosslinking to 50%.

The results were as follows:
Thickness=0.054 cm
I.E.C.=1.29 Meq/dry gram resin
Water Content=42.8%
Resistivity=28.4 ohm-cm$^2$

EXAMPLE #4

A less base stable quaternized ammonium anion exchange membrane was prepared in the same manner as described in Example #1 except that monomers used were divinyl benzene and vinyl benzyl chloride. The polymeric sheet preparation was carried out in the same manner as in Example 1 except that the polymeric sheets were methylated with tri methyl amine (TMA). These membranes have the following properties:

Thickness=0.056 cm
I.E.C.=2.06 Meq/dgr
Water Content=39.2%
Resistivity=14.3 ohm-cm$^2$ Examples #1 to 4 describe the basic preparation of quaternary ammonium salt anion exchange membranes which are to be converted into stable, low resistivity bipolar membranes. It is to be understood however that other preparations of anion exchange membranes are capable of being converted to bipolar membranes using the coating techniques of this application.

EXAMPLES #5 TO #8

Preparation of Solvent Castable and Acid Stable Cation Exchange Resins for the Purpose of Preparing Bipolar Membranes Poly 2,6 dimethyl polyphenylene oxide (PPO) was dissolved in chloroform. Concentrations ranging from thirty (30) grams to eighty (80) grams of poly 2,6 dimethyl polyphenylene oxide per liter of chloroform were placed in a resin kettle equipped with stirrer and an addition funnel.

Chlorosulfonic acid (ClSO$_3$H) was added dropwise with stirring in specified quantities so as to obtain different degrees of sulfonation of the polymer. In all cases a solid is obtained by evaporation of the solvents yielding a tough sulfonated polymer which is washed free of entrained H$_2$SO$_4$ with water and dried at 105° C. overnight.

A low degree of sulfonation will yield a sufonated product having an ion exchange capacity measuring (by titration with standard base) in the range of 0.90 to 1.7 milliequivalent counter-ion per gram of dry resin. A medium to high degree of sulfonation will yield a sulfonated product having an ion exchange capacity measuring in the range of 1.7 to 2.6 milliequivalents of counter-ion per gram of dry resin. Those sulfonated polymers will comprise solvent castable cation exchange resins which will be cast upon anion exchange membrane substrates prepared in Examples 1 to 4 to create bipolar membranes.

Four different sulfonated poly 2,6 dimethyl polyphenylene oxide thermoplastic cation exchange resins were prepared following the above procedure while adding various quantities of chlorosulfonic acid as shown below:

| Example | Amt. ClSO$_3$H Added/liter CHCl$_3$ per 60 grms PPO | I.E.C. | % H$_2$O | Solubility |
|---|---|---|---|---|
| #5 | 24 gms. | 2.18 | 47.6 | CHCL$_3$ |
| #6 | 21 gms. | 1.87 | 38.8 | 1:1 CHCl$_3$/MeOH |
| #7 | 18 gms. | 1.69 | 30.0 | 4:1 CHCl$_3$/MeOH |
| #8 | 15 gms. | 1.48 | 27.0 | 4:1 CHCl$_3$/MeOH |

These resins were prepared as tan powders, and depending on the degree of sulfonation, are soluble in either plain methyl alcohol or in up to 4:1 chloroform-methyl alcohol mixed solvent. These materials in their respective solvents are used to coat an anion exchange membrane; previously discussed in Examples 1-4, to effect the creation of a stable, low resistance, bipolar membrane.

EXAMPLE #9

Preparation of a Solvent Castable, Acid and Chlorine Stable Cation Exchange Resin For Use in Preparing a Bipolar Membrane Polyether sulfone (UDEL-3500 Amoco Chemicals) is dissolved, with stirring, into methylene chloride contained in a 1 liter resin kettle equipped with stirrer and an addition funnel. Chlorosulfonic acid dissolved in methylene chloride are added to the above slowly with stirring at room temperature. A white precipitate forms which is collected by decantation, washed with water and subsequently dried overnight in a 105° oven.

The sulfonated polysulfone had a cation exchange capacity of 1.32 Meq./dry gram of resin and was found to be soluble in N-methyl pyrrolidone and a 2:1 mixture of methylene chloride-methyl alcohol. This material, in the latter solvent mixture, is cast upon a previously prepared anion exchange membrane so as to make a stable, low resistance bipolar membrane.

EXAMPLE #10

Preparation of a Solvent Castable, Acid Resistant Cation Exchange Resin For Use in Preparing a Bipolar Membrane Polystyrene (M.W.=250K) was dissolved in ethanol stabilized chloroform in a 1 liter resin kettle equipped with a stirrer and an addition funnel. A solution of chlorosulfonic acid in chloroform was added dropwise, with stirring, at ambient temperature. Partially sulfonated polystyrene sulfonic acid precipitated from the chloroform solution. The liquid was decanted and the partially sulfonated polystyrene was dissolved in methyl alcohol. The alcohol solution of partially sulfonated polystyrene was poured into trays and the alcohol evaporated to dryness. The polymer film remaining in the trays was removed, cut up into square wafers, and extracted with tap water to remove final traces of non polymeric acids. Analysis of the dried resin from the above was as follows:

Ion Exchange Capacity=1.77 Meq./dgr.

This material, in methanol or isopropanol, is cast upon a previously prepared anion exchange membrane so as to make a stable, low electrical resistance, bipolar membrane.

EXAMPLE #11

One anion exchange membrane prepared in Example #1 is dried and placed on a flat glass plate surface in a well ventilated fume hood. The partially sulfonated poly 2,6 dimethyl polyphenylene oxide of Example #8 (I.E.C.=1.48 Meq./dgr.) was dissolved in a mixture of chloroform and methyl alcohol and brush coated onto the dry anion exchange membrane to form even wet coats. Each coat was allowed to air dry before applying further coats. The final bipolar membrane was dry heated in a convection oven, stripped from the glass plate and immersed in distilled water. The final conversion of the bipolar membrane into sodium and chloride form is completed by equilibration in 1N NaCl solution followed by washing the membrane free of salt.

The above bipolar membrane layers could not be separated by use of a spatula, or knife edge. It was stable in 2N HCl and in 2N NaOH for 3 days immersion time in each solution.

An evaluation of wet thickness (t) data gave the following:

Ex. 1—Original Anion Exchange Membrane, t=0.058 cm(22.8 mils)

Ex. 11—Final bipolar membrane, t=0.062 cm(24.4 mils)

Thickness of the sulfonated 2,6 dimethyl PPO coat, t=0.004 cm.(1.6 mils)

EXAMPLE #12

The bipolar membrane prepared in Example #11 had a circular piece cut from the sheet using a steel circular die and was mounted into a four compartment Lucite test cell. The active area of the membrane was 11.4 cm$^2$.

The test cell consisted of a cathode and anode electrode of platinum coated titanium located at the terminal ends of the cell with three membranes located there between and positioned from each other and from the electrodes with gasketed spacers to form liquid containing compartments or chambers. Thus the arrangement was as follows: the cathode, cathode compartment, commercial type anion membrane (Ionics, Inc. AR204), Compartment A, the bipolar membrane of Example 11, Compartment B, a commercial type cation membrane (Ionics, Inc. CR61), the anode compartment and finally the anode.

Each compartment consisted of about 10 ml volume and 11.4 cm$^2$ in cross sectional area. Compartment A and B contained 0.25N sodium acetate salt in static condition while the electrode compartments containing the catholyte and anolyte solutions were flowing (by peristaltic pumping) at 250 ml/min. The electrode solution consisted of 0.20N sodium acetate plus 0.05N acetic acid.

At a current density of 60 ma/cm$^2$, a voltage of 1.3 volts was recorded across the bipolar membrane (720 milliamperes) which shows a highly conductive bipolar membrane. Compartment A at 10 minutes had produced a net 3.48 Meq. H$^+$ and Compartment B at 10 minutes had produced a net 3.01 Meq. OH$^-$ from water being split at the bipolar membrane interface. This translates into a current efficiency (CE) of 77.3% for (H$^+$) in Compartment A and 66.9% for (OH$^-$) in Compartment B. In fact the current efficiencies for acid and base generation are identical at the bipolar membrane. The difference is caused by loss of acid or base through the membranes adjacent to the bipolar membrane.

EXAMPLE #13

An anion exchange membrane prepared in Example #2 was dried from methyl alcohol in a stream of air at R.T. after its methylation step was methyl chloride and was taped to a 10″×11″ glass plate. A solution of sulfonated 2,6 dimethyl polyphenylene oxide prepared in Example #5 (I.E.C.=2.18 Meq./dgr) was painted onto the anion exchange membranes surface as described in Example #11. As in Example #11, this bipolar membrane, after soaking for 1 hour in distilled water, was inseparable (anion and cation exchange layers) by attempted delamination with spatula, or knife edge.

This membrane was also stable to 2N HCl and in 2N NaOH over a three day period.

An evaluation of wet thickness data gave the following:

Ex. 2—Original Anion Exchange Membrane t=0.057 cm(22.5 mils)

Ex. 13—Final Bipolar Membrane t=0.060 cm(23.6 mils)

Thickness of three sulfonated 2,6 dimethyl PPO coats=0.003 cm(1.1 mils)

EXAMPLE #14

The same tests were carried out on the bipolar membrane of Example #13 as described in Example #12.

At a current density of 60 milliamperes/cm$^2$ a bipolar membrane voltage of 1.0 volts was recorded (720 milliamps) which again shows a highly conductive bipolar membrane. Using the Lucite test cell, it was found that Compartment A after 10 minutes had produced 2.03 milliequivalents of acid (H$^+$) and Compartment B after 10 minutes, had produced 1.58 milliequivalents of base (OH$^-$) from water being split at the bipolar membrane interface. This translates into a CE of 45% for Compartment A and 35% for Compartment B.

EXAMPLE #15

An anion exchange membrane prepared in Example #4 was dried completely of water in a convection oven at 50° C. for 4 hours then taped to a 10″×11″ glass plate and coated with the chloroform-methanol solvated poly 2,6 dimethyl polyphenylene oxide sulfonic acid prepared in Example #8 (I.E.C.=1.48 Meq./dgr.) by brush application. The prepared bipolar membrane was not any different in physical appearance than those of Examples 11 and 13.

EXAMPLE #16

The same tests were carried out as previously using the Lucite test cell. At a current density of 60 milliamperes/cm$^2$, a bipolar membrane voltage of 0.90 volts was recorded (720 milliamperes) which again shows a highly conductive bipolar membrane. It was found that Compartment A and B respectively after 10 minutes had produced a net 3.38 Meq. H$^+$ and a net 2.83 Meq. OH$^-$ from water being split at the bipolar membrane interface. This translates into a CE of 75% for Compartment A and 63% for Compartment B.

EXAMPLE #17

An anion membrane prepared in Example #1 was dried completely of water in a convection oven at 50° C. for 4 hours then taped to a 10"×10" glass plate. The sulfonated ion exchange resin prepared from polyether sulfone in Example #9 was painted onto the membrane from a 2 to 1 methylene chloride-methyl alcohol solution containing 7% partially sulfonated polyether sulfone. Several coatings were applied with heating as described in Example #11.

Upon development in water, this bipolar membrane showed good adherence between the cation and anion exchange layers. In 0.25N sodium acetate, a voltage across the bipolar membrane of 1.25 volts was recorded. Again, this is good electrical conductance.

EXAMPLE #18

An anion exchange membrane prepared in Example #4 was dried as discussed in Example #11 and a solution of 8.5% partially sulfonated polystyrene in pure methyl alcohol prepared in Example #10, was coated onto the anion membrane as has been previously described in Example #15.

After development of this bipolar membrane in water it was noted that once again good adhesion of the two layers exists and in 0.25N sodium acetate, a voltage of 0.87 volts was recorded. Again, this is good electrical conductance.

EXAMPLE #19

The bipolar membrane prepared in Example #11 was assembled in the Lucite test cell. Each static compartment (A and B) adjacent to each side of the bipolar membrane was filled with 0.1N sodium citrate (the salt of a strong acid and a strong base).

The cell was used a total of 50 hours at 60 Ma/cm$^2$ to make citric acid on the PPO sulfonated side of the bipolar membrane (Compartment A) and sodium hydroxide on the anion membrane side of the bipolar membrane (Compartment B). The static compartments were drained and replaced with fresh sodium citrate at one hour intervals during the long test.

The current efficiency (CE) based upon citric acid production was 81% and the voltage drop across the bipolar membrane was 1.1 volts which showed a good performance of the bipolar membrane.

At the end of 50 hours, the bipolar membrane showed the following data comparison.

| | Resistivity ohm-cm$^2$ | Anion Membrane IEC Meq/dgr | % H$_2$O | Thickness Anion Exchange Membrane | Thickness Cation Exchange Membrane |
|---|---|---|---|---|---|
| Bipolar Membrane (Zero hrs) | 21.5 | 2.15 | 42.4 | 0.058 cm | 0.004 cm |
| Bipolar membrane (after 50 hrs. @ 60 ma/cm$^2$) | 20.9 | 2.14 | 41.9 | 0.058 cm | 0.004 cm |

No delamination or blistering was noted on visual examination of this bipolar membrane after long term testing. The above data shows the excellent stability of the bipolar membrane.

EXAMPLE #20

The Lucite test cell was again used with the following changes made:
(1) The bipolar membrane was composed of the anion exchange membrane of Example #1 mated with the sulfonated PPO cation exchange membrane of Example #8 (I.E.C.=1.48 Meq./dgr)
(2) Compartment A contained 0.025N sulfuric acid (H$_2$SO$_4$) and was not flowing.
(3) Compartment B contained 0.025N sodium hydroxide (NaOH) and was not flowing.
(4) Electrode compartments contained 1% K$_2$SO$_4$ and were flowing at 250 ml/min respectively.

Using the test cell above, a run was made for 30 minutes at 0.72 amps which corresponds to 60 ma/cm$^2$. The voltage measured across the bipolar membrane after 5 minutes was 1.05 volts, which shows a low resistivity for the bipolar membrane. The current efficiency results were as follows: Acid Production=52.0% and Base Production=67.0%.

EXAMPLE #21

The same parameters were operative as with Example #20 except that the bipolar membrane was a composite of the anion exchange membrane prepared in Example #4 with the cation exchange film described in Example #8. The voltage measured across the bipolar membrane was 1.00 volts which shows a low resistivity for the bipolar membrane. Results of current efficiencies were: Acid Production=56% and Caustic Production=68%.

EXAMPLE #22

The anion exchange membrane prepared in Example #2 is attached by tape to a 5"×8" glass plate and dried in a 50° C. oven for 3 hours.

A liquid cation exchange resin (Bis 2 ethyl hexyl pyrophosphoric acid) is dissolved in 25 ml of methyl alcohol and is painted onto the dry membrane several times with an air drying step between each application. The composite solid anion exchange membrane with a liquid cation exchange membrane painted onto one surface is then equilibrated in distilled water overnight.

The above composite was mounted into the Lucite test cell surrounded by solutions of 0.025N sodium sulfate. The voltage across the bipolar membrane was found to be 1.85 volts at 0.72 amps which is a good bipolar membrane resistivity.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

We claim:

1. A water insoluble bipolar permselective membrane comprising a charged thin solid layer of a solvent castable, homogeneous, non-cross linked, ionic polymer inseparably attached to one surface of an oppositely charged, thicker solid polymer layer.

2. The membrane of claim 1 wherein said thin layer is no greater than 10 mil thick.

3. The membrane of claim 1 wherein said thicker layer is between 5 to 40 mil thick.

4. The membrane of claim 1 wherein said thin layer comprises a thermoplastic partially sulfonated aromatic cation exchange polymer and said thicker layer comprises a quaternary ammonium salt anion exchange polymer.

5. The membrane of claim 4 wherein said cation exchange polymer is selected from the group consisting of polystyrene, polyalkylstyrenes, 2,6 dialkyl polyphenylene oxides, 2,6 diaryl polyphenylene oxides, 2,6 arylalkyl polyphenylene oxides, polyether sulfones, substituted polyether sulfones, poly arylether sulfones and polyphenylene sulfides.

6. The membrane of claim 1 wherein said thin layer comprises a liquid ion exchange material that has been coated onto one surface of the oppositely charged solid polymer layer.

7. The membrane of claim 6 wherein said liquid ion exchange material is the cation exchanger, bis 2 ethyl hexyl pyrophosphoric acid.

8. The membrane of claim 6 wherein said liquid ion exchange material is the anion exchanger, tri capryl methyl ammonium chloride.

9. A dual layer water insoluble bipolar polymeric membrane comprising a first layer of a base stable, quaternary ammonium salt anion exchange polymer sheet and a second thinner layer or coating of an acid stable, solvent castable, homogeneous, non-cross linked, cation exchange polymer permanently bonded to one major surface of said anion exchange polymer sheet.

10. The membrane of claim 9 wherein said first layer is between 5-40 mils thick.

11. The membrane of claim 9 wherein said cast polymer of said second layer is not greater than 10 mils thick.

12. The membrane of claim 9 wherein the thin bonded cation polymer layer is a partially sulfonated aromatic polymer selected from the group consisting of polystyrene, polyalkylstyrenes, 2,6 dialkyl polyphenylene oxides, 2,6 diaryl polyphenylene oxides, 2,6 arylalkyl polyphenylene oxides, polyether sulfones, substituted polyether sulfones, poly arylether sulfones and polyphenylene sulfides.

13. The membrane of claim 9 wherein the anion exchange polymer layer is reinforced with a woven fabric material.

14. A process for producing a water insoluble bipolar permselective membrane comprising depositing a charged liquid thin coating of a homogeneous solvent, non-cross linked polymer mixture on one major surface of an oppositely charged solid polymer membrane substrate having a thickness substantially greater than said charged thin coating and thereafter allowing the solvent of said thin coating to evaporate to form on said solid substrate a substantially inseparable, solid, thin layer thereon.

15. The process of claim 14 wherein said charged solvent-polymer mixture is deposited on said solid membrane substrate by painting, brushing, rolling or spraying coatings thereon until the desired thickness is obtained.

16. The process of claim 14 wherein the desired thickness of said charged coating is not greater than ten mils.

17. The process of claim 14 wherein said non crosslinked polymer is a partially sulfonated aromatic cation exchange polymer selected from the group consisting of polystyrene, polyalkylstyrenes, 2,6 dialkyl polyphenylene oxides, 2,6 diaryl polyphenylene oxides, 2,6 arylalkyl polyphenylene oxides, polyether sulfones, substituted polyether sulfones, poly arylether sulfones and polyphenylene sulfides.

18. A process for producing a water insoluble bipolar perm-selective membrane comprising depositing a thin coating of a castable homogeneous solvent, non-cross linked, cation exchange polymer mixture on one major surface of a solid base stable, quaternary ammonium salt anion exchange polymer membrane substrate having a thickness substantially greater than said thin coating of cation exchange polymer and thereafter allowing the solvent of said thin coating of solvent-polymer mixture to evaporate to form on said solid anion exchange substrate a substantially inseparable, solid, thin, homogeneous, non-cross linked cation exchange layer thereon.

* * * * *